(12) United States Patent
Verdoes et al.

(10) Patent No.: US 7,883,551 B2
(45) Date of Patent: Feb. 8, 2011

(54) PROCESS FOR CARRYING OUT CRYSTALLIZATION

(75) Inventors: Dirk Verdoes, Apeldoorn (NL); Earl Lawrence Vincent Goetheer, Westdorpe (NL); Zhuo Hornstra-Xu, Houten (NL); Jan Izaak Walpot, Apeldoorn (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 804 days.

(21) Appl. No.: 11/661,057

(22) PCT Filed: Sep. 2, 2005

(86) PCT No.: PCT/NL2005/000636

§ 371 (c)(1),
(2), (4) Date: Sep. 24, 2007

(87) PCT Pub. No.: WO2006/025741

PCT Pub. Date: Mar. 9, 2006

(65) Prior Publication Data

US 2008/0134471 A1   Jun. 12, 2008

(30) Foreign Application Priority Data

Sep. 3, 2004   (EP) .................................. 04077465

(51) Int. Cl.
*C13K 1/10* (2006.01)
(52) U.S. Cl. ...................................... 23/295 R; 23/296
(58) Field of Classification Search ............... 23/295 R, 23/296
See application file for complete search history.

(56) References Cited

U.S. PATENT DOCUMENTS

| 2,594,723 | A | 4/1952 | Berteaux |
| 3,726,774 | A | 4/1973 | Difford et al. |
| 4,389,317 | A | 6/1983 | Trentelman et al. |
| 6,399,031 | B1 | 6/2002 | Herrmann et al. |

FOREIGN PATENT DOCUMENTS

| DE | 39 20 999 | 9/1990 |
| DE | 3920999 | 9/1990 |
| WO | WO 92/07226 | 4/1992 |
| WO | WO92/07226 | 4/1992 |
| WO | WO03/084631 | 10/2003 |
| WO | WO 03/084631 | 10/2003 |

*Primary Examiner*—Edward M Johnson
(74) *Attorney, Agent, or Firm*—Hoffmann & Baron, LLP

(57) ABSTRACT

The present invention is directed to a crystallization process and apparatuses for such processes. In a first aspect, the process of the invention comprises a step wherein a liquid comprising a solvent and material dissolved therein, is subjected to crystallization conditions in the presence of Dean vortices, which Dean vortices result from said liquid flowing through a channel having at least one curvature. In a second aspect, the invention is directed to a crystallization process, which comprises a step wherein a liquid comprising a solvent, material dissolved therein and heterogeneous particles is subjected to crystallization conditions in the presence of Dean vortices, which Dean vortices result from said liquid flowing through a channel having at least one curvature, wherein said material crystallizes on solid surfaces, in particular on surfaces of the heterogeneous particles present in the feed.

12 Claims, 3 Drawing Sheets

PROCESS FOR CARRYING OUT CRYSTALLIZATION

This application is the U.S. National Phase of, and Applicants claim priority from, International Application Number PCT/NL2005/000636 filed 2 Sep. 2005 and European Patent Application bearing Ser. No. EP 04077465.5 filed 3 Sep. 2004, which are incorporated herein by reference.

BACKGROUND OF THE INVENTION

The invention is directed to processes and apparatuses for crystallization, in particular for continuous crystallization.

Although continuous crystallization provides a number of advantages, a significant fraction of the industrial sized crystallization processes are still carried out in a batch-wise fashion. One example of an industrial sized continuous crystallization process is the MSMPR (Mixed Slurry Mixed Product Removal) process. However, the problem with MSMPR is that it is difficult to generate particles with a narrow size distribution and to control the morphology. The same holds when a cascade of crystallizers is used. Moreover, the advantages of a real continuous process are not fully attained with these known processes. These advantages include inter alia a constant product quality, a smaller reactor volume and more flexibility. Especially for precipitation, which term refers to the relatively fast crystallization processes of slightly soluble salts, it is in practice very hard to keep the product quality constant during scale up of a crystallization process. This is due to the comparable timescale of mixing and reaction, which may however scale up differently. Consequently, scale up of a precipitation process in continuous stirred tank reactors often leads unwanted changes in size and/or shape and/or polymorph. Polymorphs are substances that have the same chemical formula, but a different crystal structure. This difference in crystal structure induces changes in the physical and chemical properties of the materials, such as e.g. solubility density, stability, etc. Clearly the control of such properties is of upmost importance for commercial crystalline products like pharmaceuticals and fertilizers. Calcite, aragonite and vaterite are for example polymorphs of calcium carbonate ($CaCO_3$).

DE-A-39 20 999 describes a process for continuous crystallization of nitroguanidin. Crystallization is initialized by cooling of a reactor in a tube and shell configuration. A spiral tube is used in order to quickly cool the solution. It is claimed that in this way only primary nucleation occurs and that secondary nucleation is prevented. The growth of the thus-generated primary nuclei takes place in cascade of mixed tank reactors, placed down stream of the spiral reactor.

BRIEF DESCRIPTION OF THE DRAWINGS

The preferred embodiments of the crystallization process and apparatus of the present invention, as well as other objects, features and advantages of this invention, will be apparent from the accompanying drawings wherein.

DESCRIPTION OF THE INVENTION

The present invention is directed to a precipitation process that can be operated in a continuous fashion and thus provides for the above-mentioned advantages for real continuous processes.

In a first aspect of the invention, this object is met by carrying out precipitation in the presence of so-called Dean vortices, which are formed due to the flow of the feed through a curved channel. In the first place, the supersaturation, which is the driving force for precipitation, can be generated by mixing different solutions each containing one or more dissolved components that form the crystalline product by means of a reaction. This type of precipitation process is also known as reactive crystallization. Alternatively, the supersaturation for precipitation can also be generated by mixing a solution containing the compound to be crystallized with another liquid, which lowers the solubility of the target product in the first solution. This method is also known as anti-solvent crystallization. Both reactive crystallization and anti-solvent crystallization are initiated by mixing solutions and not by changing the temperature. Thus in a first aspect, the present invention is directed to a precipitation process, which comprises a step wherein a liquid comprising a solvent and material dissolved therein is subjected to crystallization conditions in the presence of Dean vortices, which Dean vortices result from said liquid flowing through a channel having at least one curvature.

In a second aspect, the process and the reactor according to the present invention can also be used for the crystallization of materials on solid surfaces, in particular on surfaces of heterogeneous particles present in the feed, so as to provide core/shell materials (viz. coated particles), which can be used to obtain coated particles. Heterogeneous means that the solid particles are from a different material than the crystallizing compound. Hence, in a second aspect, the invention is directed to a crystallization process, which comprises a step wherein a liquid comprising a solvent, material dissolved therein and heterogeneous particles is subjected to crystallization conditions in the presence of Dean vortices, which Dean vortices result from said liquid flowing through a channel having at least one curvature, wherein said material crystallizes on solid surfaces, in particular on surfaces of the heterogeneous particles present in the feed.

Figure 1:
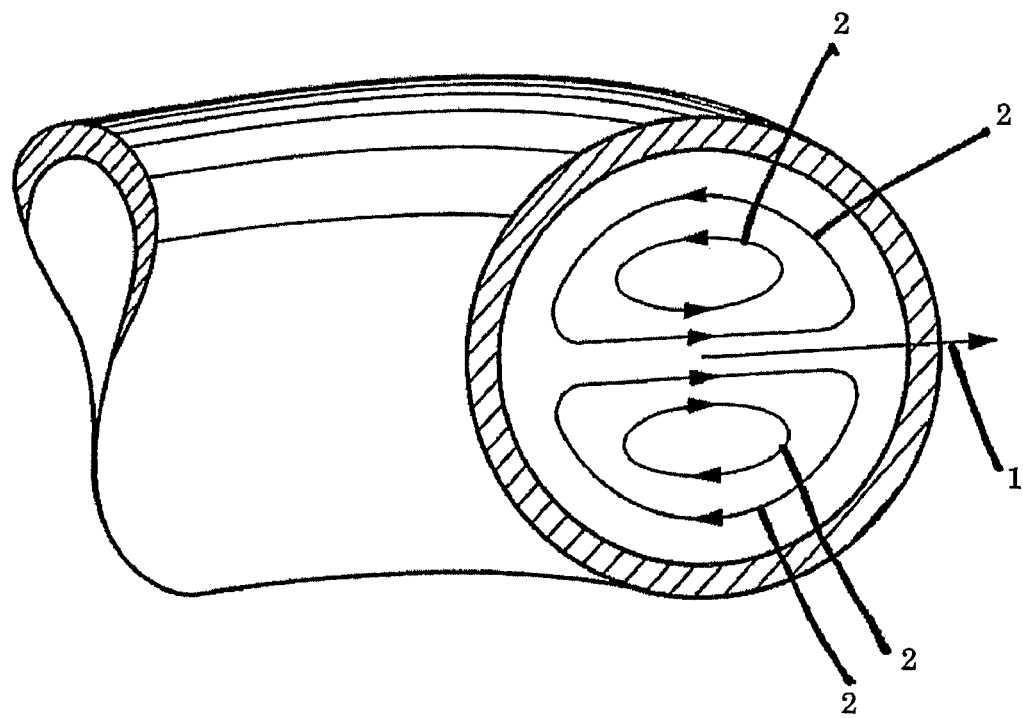
FIG. 1 illustrates the secondary flows that occur as a result of centripetal forces when a fluid flows through a curved channel.

When a fluid flows through a curved channel, in particular a channel in the form of a spiral, secondary flows occur as a result of the centripetal forces (see FIG. 1, in which arrow 1 gives the direction of the centripetal force and 2 are the streamlines of the secondary flow that results). These flows, that are in principle directed perpendicularly with respect to the flow direction through the channel, are known as Dean vortices. The intensity of these vortices may be related to the Dean number, De, which is defined as:

$$De = Re \cdot \sqrt{(D_i/D)} \quad (1)$$

wherein: $Re = \rho \cdot \upsilon \cdot D_i / \eta$ (Reynolds number);

$D_i$ is the inner diameter of the channel (for channels having a non-circular cross-section, the hydraulic diameter);

D is the diameter of the curvature of the channel;

ρ is the density of the fluid;

υ is the average fluid velocity through the channel (e.g. the flow rate in m$^3$/s divided by the cross-sectional area in m$^2$); and η is the viscosity of the fluid.

The channel is typically a tube, preferably with circular or elliptic cross section.

It was found that the above-mentioned Dean vortices have a very favourable effect on the crystallization process, which comprises nucleation and growth. Without wishing to be bound by theory, it is assumed that this is the result of the radial mixing that occurs due to the Dean vortices. As a result, the flow through the channel becomes more or less plug flow, which results in each volume element that enters the crystallizer having the same or essentially the same residence time, which in turn results in a product (crystals) having a very narrow particle size distribution and relatively small particle size. Moreover, this plug flow, which is normally (viz. in straight channels) only obtained at higher values of Re, is already obtained at relatively low flow rates, i.e. low values of Re. Thus the flow through the channel can be maintained laminar, which enables a longer residence time without the need for the use of extreme long tubes. In this way reduction of energy usage can be attained. An extra advantage is obtained when a multitude of curvatures are present, in particular when the crystallizer has the shape of a spiral (or helix), since this may result in an increase of Re at which turbulence sets on (Re$_{onset}$). In particular a spiral having D equal to 100 times D$_i$ or less, results in a considerable increase of the Re number at which turbulence commences, e.g. at Re$_{onset}$=6000 when D=50×D$_i$, or Re$_{onset}$=7600 for D=15×D$_i$. The number of curves present in such a spiralled crystallizer is preferably 2 to 10 000 more preferably 4 to 1000. Without wishing to be bound by theory it is assumed that the Dean vortices result in an excellent mixing in radial direction, combined with low mixing in axial direction. This is particularly advantageous for reactive or anti-solvent crystallization and yields completely different products and properties as compared to reactive or anti-solvent crystallization carried out in a stirred tank reactor or a straight tube reactor.

The shape of the crystallizer of the present invention may be chosen freely, as long as at least one curve is present therein. In practice, it is preferred to have a multitude of curves. Although spirally wound curvatures as described in the preceding paragraph are preferred, the present invention is not limited thereto. For instance, sinusoidal channels, e.g. those described in U.S. Pat. No. 6,399,031 can be used equally well in the present invention. Also the other configurations known from U.S. Pat. No. 6,399,031 can be used successfully in accordance with the present invention.

Another configuration that is very suitable for carrying out the present invention is described in WO-A-92/07226. These known apparatuses are described for use as heat-exchangers and polymerization reactions only, no reference or suggestion being made to crystallization purposes. According to this embodiment, the crystallization is carried out in one of the spirals that is present in a spiral heat exchanger provided with a cylindrical casing, inside which the liquid to be crystallized can flow through and a channel which runs as a spiral around the cylinder axis and through which a cooling medium can flow, wherein in addition to the one spiral channel and in each case alternating therewith, at least one additional spiral channel is provided through which another cooling medium can flow, and in that a straight channel through which the first medium can flow is formed centrally within the two spiral channels. The present invention can be used for crystallizing a variety of materials, in particular inorganic materials, such as MnCO$_3$, AgBr and ZnS; organic materials, such as pharmaceuticals, pigments.

Another important advantage of the present invention is that the size distribution and/or the morphology and/or the crystal structure (polymorph) of the produced crystals may be controlled by changing the flow conditions through said channel. The fact that a process according to the present invention is scaled up by multiplication of the number of reactors instead of by increasing the size of the reactor implies that the production scale can be varied, while maintaining important product properties like size, shape or crystal structure. It was found that a reactive crystallization process according to the invention can be used to influence the polymorph which is formed, for instance by varying the residence time and/or concentration of the reactant(s). This effect can be of special interest for instance in pharmaceutical applications.

Furthermore, it was found that a reactive crystallization process according to the invention can also be used to influence the particle size and particle size distribution, as will be illustrated in the example hereinbelow.

With the process of the invention it is also possible to deposit coating layers on heterogeneous solid particles so as to provide core/shell materials. The low tendency for agglomeration in the crystallization process of the present invention is beneficial for the formation of uniform layers. These coated particles are amongst others usable as controlled release particles. But also other pharmaceutical applications are within the scope of the present invention, such pills coated with a conventional coating, such as a sugar coating or the like. An example of these multilayer particles is the deposition of fat or sugar on active pharmaceutical ingredients. The term "crystallization" in this context is used in a broad sense and covers heterogeneous nucleation, as well as growth, viz. any process by which dissolved materials precipitate from solution on heterogeneous solid surfaces due to supersaturation, and thus includes reactive crystallization, anti-solvent crystallization and cooling crystallization.

After the crystallization step is carried out in accordance with the present invention, a successive separation step may be carried out, e.g. by employing solid/liquid separation with conventional methods, such as filtration or centrifugation.

The crystallizer can be made from a broad selection of materials, such as metals, e.g. aluminum, stainless steel; plastics, such as polyolefins, polyvinylchloride (PVC) or polytetrafluoroethylene (PTFE), in particular where the amount of heat that is to be removed is not very large; ceramics; glass; and the like.

EXAMPLE

The present invention will be illustrated by the reactive crystallization of calcium carbonate from sodium carbonate and calcium chloride:

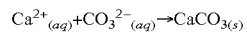

$$Ca^{2+}_{(aq)} + CO_3^{2-}_{(aq)} \rightarrow CaCO_{3(s)}$$

Figure 5:
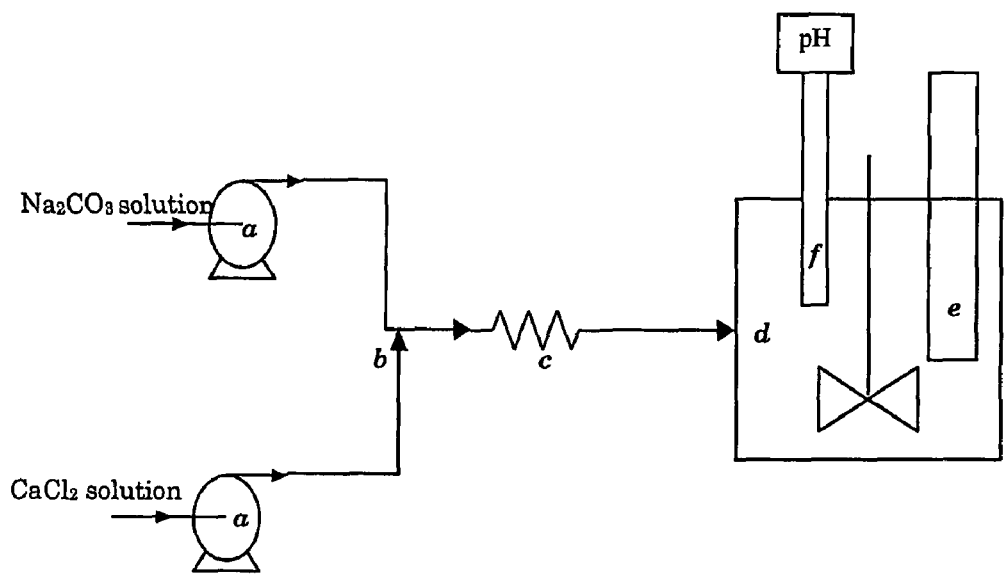
FIG. 5 is a schematic of the system that was used with a preferred embodiment of the crystallizer of the present invention.

The crystallization setup that was used is schematically depicted in FIG. 5.

The solutions were prepared using demineralized water. The solutions were pumped through the system using a hose pump (a) (Watson-Marlow 502S). The streams were mixed at mixer (b) after which they were fed through the crystallizer (c), which was either a helix (in accordance with the present invention) or a straight tube (reference). In the crystallizer the precipitation takes places, resulting in the formation of CaCO$_3$ crystals.

The effluent of the crystallizer is subsequently fed to a stirred vessel (d), where the particle size distribution analysis is carried out. The particle size distribution was measured using Focused Beam Reflectance Measurement (FBRM). To this end FBRM probe (e) was inserted. The reaction was stopped by titration with acid. The acid was added using automatic titrator (comprising a pHM82 pH meter (f); a TTT80 titrator; and a ABU 80 buret). In this way the pH of the suspension in the stirred vessel was kept at a value of 8.

After the particle size distribution is analyzed, the suspension is taken from the stirred vessel and filtered using a filter with a pore size of 0.45 µm. The residue, $CaCO_3$, remains on the filter. Subsequently, the $CaCO_3$ was dried and subjected to SEM (Scanning Electron Microscopy) analysis. This provides information on the crystal morphology as well as on the particle size and the particle size distribution.

First a straight tube was used as the crystallizer. The flow rate used was 100 ml/min. The concentration was 100 mmol/$dm^3$. Solution (a) was 100 mmol/$dm^3$ $Na_2CO_3$, solution (b) was 100 mmol/$dm^3$ $CaCl_2$.

The straight tube, made of silicone rubber, had the following dimensions: inner diameter (ID) 3.00 mm; outer diameter (OD) 7.00 mm; length 3.00 m.

Figure 2:
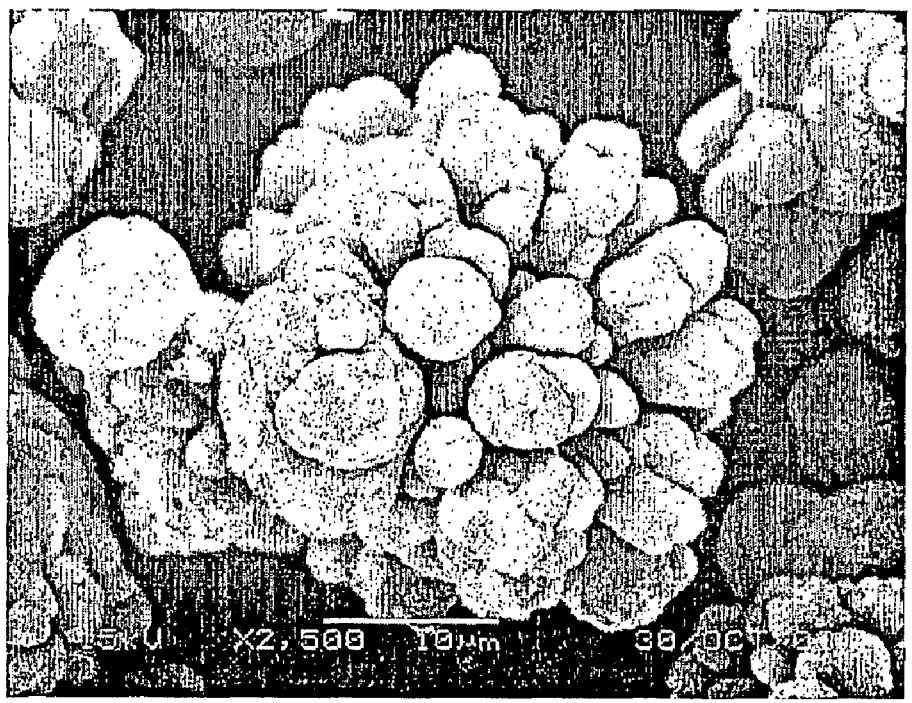
FIG. 2 is a Scanning Electron Microscopy micrograph of crystals that were formed using a straight tube as a crystallizer.

A SEM micrograph of the crystals thus obtained is depicted in FIG. 2.

This experiment was repeated, however, now a helix crystallizer in accordance with the present invention was used.

The same materials in the same flow were fed through a silicone rubber helix crystallizer having the following dimensions: inner diameter (ID) 3.00 mm; outer diameter (OD) 7.00 mm; length of the channel 3.00 m (when "unwounded"); helix diameter 2.00 cm; the diameter of each winding was 20.24 mm; the pitch (distance between two adjacent curves measured along the winding axis) was 9.74 mm; the length of the helix was 64 cm; the number of curves was 33; the curvature (commonly expressed as κ) was 96.55; the torsion (commonly expressed as τ) was 14.798.

The flow rate was 100 ml/min, resulting in a residence time of 2.71 seconds. Re was 707 and De was 272.2.

Figure 3:
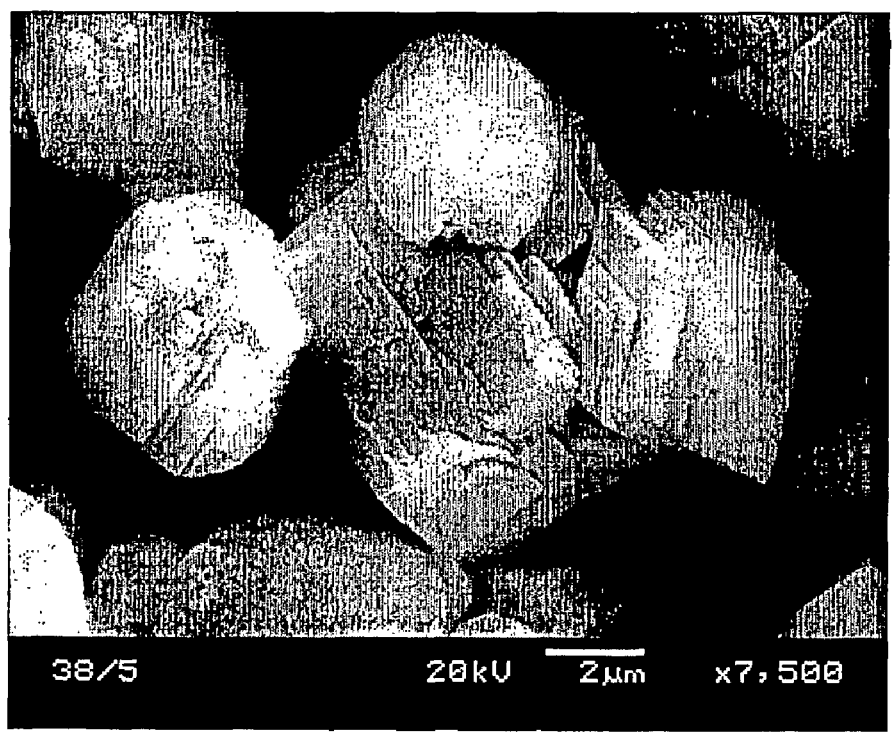
FIG. 3 is a Scanning Electron Microscopy micrograph of crystals that were formed in accordance with a preferred embodiment of the crystallizer of the present invention.

A SEM micrograph of the crystals obtained using the helix crystallizer in accordance with the present invention is depicted in FIG. 3. It was clear that the morphology of the produced crystals is affected by the flow conditions in the new crystallizer compared with the solid product properties produced in the conventional tube reactor. The differences in shape of the crystals in FIGS. 2 and 3 also indicate that the crystal structure (polymorph) is changed. The cauliflower-like shape of the crystals in FIG. 2 is typical for the polymorph vaterite, whereas the rhombohedral shape of the crystals in FIG. 3 is typical for the polymorph calcite.

Figure 4:
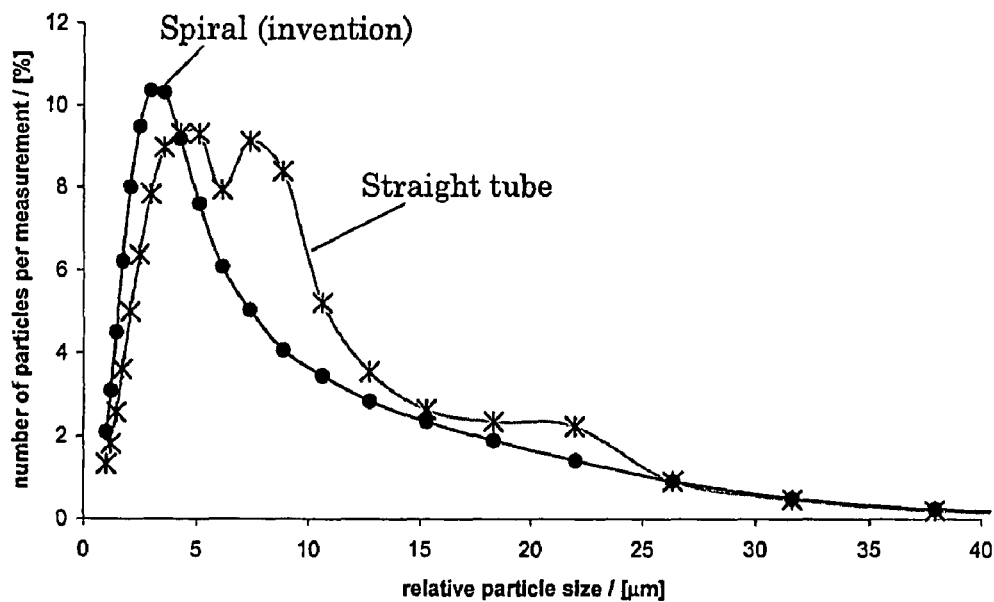
FIG. 4 is a graph showing a comparison between crystals formed using a straight tube crystallizer and crystals formed using a preferred embodiment of the crystallizer of the present invention.

In FIG. 4a comparison is made between the particle size distribution of the crystals that were obtained using the straight tube (x) and the helix (●) crystallizer From the results it clearly follows that according to the invention crystals are obtained that are smaller in size and have a particle size distribution that is narrower, as compared to a process that is carried out in a straight tube crystallizer.

The invention claimed is:

1. Reactive or anti-solvent crystallization process, which comprises a step wherein a liquid comprising a solvent and two or more compounds dissolved therein, is subjected to crystallization conditions in the presence of Dean vortices, which Dean vortices result from said liquid flowing through a channel having at least one curvature.

2. Crystallization process, which comprises a step wherein a liquid comprising a solvent, material dissolved therein and heterogeneous particles, is subjected to crystallization conditions in the presence of Dean vortices, which Dean vortices result from said liquid flowing through a channel having at least one curvature, wherein said one or more compounds crystallize on solid surfaces, in particular on surfaces of the heterogeneous particles present in the feed.

3. Process according to claim 1, wherein said channel is a tube in the shape of a spiral.

4. Process according to claim 3, wherein said spiral comprises 2 to 10,000 curves.

5. Process according to claim 1, wherein said channel is a tube having a hydraulic diameter $D_f$, preferably a tube having circular cross-section, wherein the Dean number, De, is less than 3000, preferably from 0.5 to 1500, wherein $$De = Re \cdot \sqrt{(D_f/D)};$$

$$Re = \rho \cdot v \cdot D_f / \eta \text{ (Reynolds number)};$$

D is the diameter of the curvature of the channel; ρ is the density of the liquid; υ is the average liquid velocity through the channel; and η is the viscosity of the liquid.

6. Process according to claim 1, wherein said crystallization conditions comprises forming supersaturation conditions for said liquid.

7. Process according to claim 6, wherein said supersaturation is created by initiating a chemical reaction, and/or addition of an anti-solvent and/or by lowering the temperature.

8. Process according to claim 1, wherein the process should be maintained at a certain temperature or where heat is added or removed from the crystallization process.

9. Process according to claim 8, wherein said heat is added or removed, using a heat fluid that is in heat conducting contact with said channel.

10. Process according to claim 9, wherein said heat fluid is a coolant that flows through a channel or tube separate from said channel having at least one curvature.

11. Process according to claim 1, which is a continuous process.

12. Process according to claim 1, where the morphology and/or polymorph of the produced crystals is controlled by changing the flow conditions through said channel.

* * * * *